United States Patent [19]

Hall

[11] 4,438,896
[45] Mar. 27, 1984

[54] SEGMENTED COLLAR TRIPOD FOR HOLDING SURVEYOR'S STAKE

[76] Inventor: George W. Hall, 3200 Viking Dr., Sioux City, Iowa 51104

[21] Appl. No.: 305,916

[22] Filed: Sep. 28, 1981

[51] Int. Cl.³ .............................................. F16M 13/00
[52] U.S. Cl. ...................................... 248/523; 248/168
[58] Field of Search ............... 248/168, 169, 170, 171, 248/188.6, 434, 435, 523

[56] References Cited

U.S. PATENT DOCUMENTS

| | | | |
|---|---|---|---|
| 1,064,798 | 6/1913 | Walte | 248/171 |
| 1,235,388 | 7/1917 | Sherwood | 248/170 X |
| 1,724,320 | 8/1929 | Skultety | 248/168 |
| 3,162,410 | 12/1964 | Owens | 248/170 X |

FOREIGN PATENT DOCUMENTS 270592  5/1927  United Kingdom ................. 248/168

*Primary Examiner*—J. Franklin Foss
*Attorney, Agent, or Firm*—Zarley, McKee, Thomte, Voorhees & Sease

[57] ABSTRACT

The present invention utilizes a segmented collar formed from at least three collar segments, which are placed in end-to-end relationship to form a circular collar having a central opening therein for receiving a surveyor's stake. The collar segments are secured together by bolts extending through flanges at the adjacent ends of the collar segments. The tripod includes three legs, the upper ends of which are secured between the adjacent flanges of the collar segments. The bolts extending through the adjacent flanges and through the upper ends of the tripod legs are adjustable to tighten and loosen the hinged connection of the legs to the collar. Thumb screws extend through each of the collar segments for threadable movement inwardly toward the surveyor's stake located within the stake receiving opening.

1 Claim, 3 Drawing Figures

U.S. Patent    Mar. 27, 1984    4,438,896
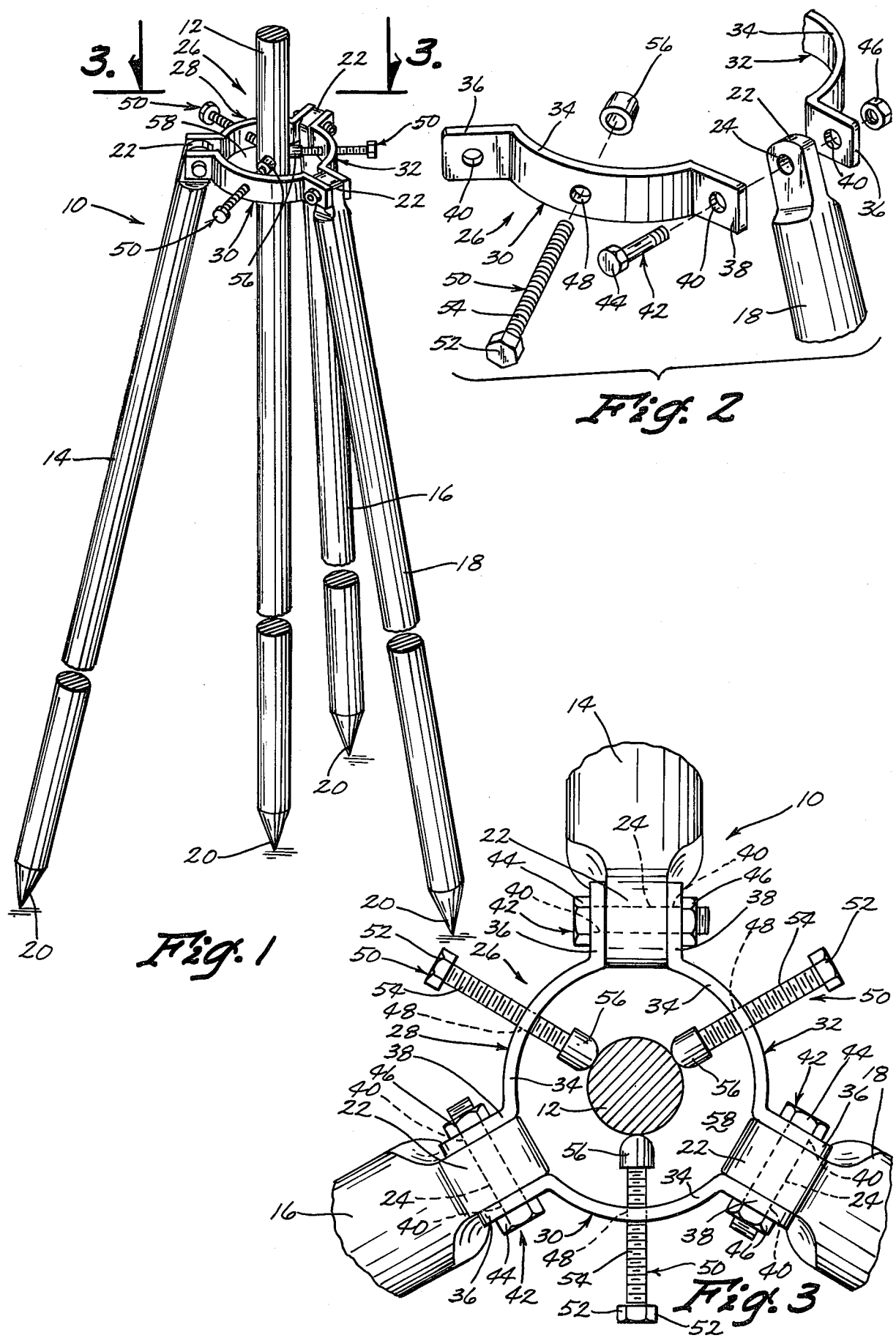

SEGMENTED COLLAR TRIPOD FOR HOLDING SURVEYOR'S STAKE

BACKGROUND OF THE INVENTION

This invention relates to a segmented collar tripod for holding a surveyor's stake.

One problem encountered with tripods for holding surveyor's stakes is the desirability of leveling the platform or collar at the upper end thereof. It is therefore desirable to be able to pivot the tripod legs with respect to the platform to a position wherein the tripod legs will support the platform in a level position. Once this position is attained, it is desirable to lock the hinged connection between the tripod legs and the platform to prevent further movement of the platform with respect to the tripod legs.

Therefore, a primary object of the present invention is the provision of an improved tripod for holding a surveyor's stake.

A further object of the present invention is the provision of a tripod for holding a surveyor's stake wherein the upper end of the tripod legs are joined by a segmented collar having a central opening therein for receiving the surveyor's stake.

A further object of the present invention is the provision of a collar at the upper end of the tripod which is simple in construction and economical to manufacture.

A further object of the present invention is the provision of a tripod having three legs which are hingedly connected to a segmented collar, the hinged connection being adjustable to permit selective locking of the hinged connection so that the legs will not pivot.

A further object of the present invention is the provision of a device which is economical to manufacture, durable in use and efficient in operation.

SUMMARY OF THE INVENTION

The present invention utilizes a three segment collar formed from three segments, each having radially extending flanges at the opposite ends thereof. The tripod legs each include an upper end which is positioned between one of the adjacent pairs of flanges on the collar segments. A bolt extends through the flanges and the upper end of the leg and is threadably adjustable to tighten or loosen the hinged connection of the leg to the collar.

Thus, it is possible with the present invention to pivot the legs of the tripod to various positions until the tripod collar is oriented in a horizontal position. The hinged connections of the legs to the collar can then be tightened so as to lock the legs against further pivotal movement and so as to hold the legs in a stationary position with respect to the collar.

Thumb screws extend through the collar segments for engaging the surveyor's stake when it is positioned in the central opening of the collar. Other grasping means may be used in the place of these thumb screws without detracting from the invention.

BRIEF DESCRIPTION OF THE DRAWINGS

FIG. 1 is a perspective view of the present invention.

FIG. 2 is a partially exploded perspective view showing the inter-relationship of the parts of the present invention.

FIG. 3 is a sectional view taken along line 3—3 of FIG. 1.

DETAILED DESCRIPTION OF THE INVENTION

Referring to the drawings, the numeral 10 generally refers to the tripod of the present invention. Tripod 10 is shown in FIG. 1 holding a vertically disposed surveyor's stake for range pole 12.

Tripod 10 includes three tripod legs 14, 16, 18 each of which includes a pointed lower end 20 and a flattened upper end 22 having a bolt receiving hole 24 extending therethrough.

The numeral 26 generally designates a segmented collar assembly which is comprised of at least three collar segments 28, 30, 32. The number of segments may be varied without detracting from the invention, but with a tripod configuration it is preferred that three segments be used. Each segment 28, 30, 32 is identical in construction and includes an arcuate portion 34 having a pair of radially extending flanges 36, 38 at the opposite ends thereof. Each flange 36, 38 includes a bolt receiving opening 40 therein.

Collar segments 28, 30, 32, are arranged so that their arcuate portions form an approximate circle, with the flanges 36, 38 of each segment extending radially outwardly, and with the flanges 36, 38 of adjacent segments being positioned in facing relationship as shown in FIG. 3. In this position, bolt receiving holes 40 are in registered alignment.

The flattened ends 22 of legs 14, 16 and 18 are positioned between the spaced apart flanges 36, 38 of the collar segments 28, 30 and 32 as shown in FIG. 3. Bolt 42 extends through the registered holes 40 and 24 of the flanges 36, 38 and of the flattened portion 22 of the legs so as to provide a hinged connection of the legs to the flanges. Bolts 42 each include a head 44 and a nut 46 at opposite ends thereof for embracing the flanges 36, 38 therebetween. Nut 46 may be tightened or loosened to lock or release the hinged connection of the legs to the flanges.

Each arcuate portion 34 of each segment 26, 28, 30 includes a thumb screw opening 48 for threadably receiving a thumb screw 50. Each thumb screw 50 includes a head 52, a threaded shank 54, and a cap 56 adapted to engage the range pole 12. As can be seen in FIG. 3, and FIG. 1, adjustment of thumb screws 50 permits the inner end caps 56 to engage the range pole 12 and hold range pole 12 against movement.

Thumb screws 50 are not essential to the present invention. Other types of securing means may be used and are well known in the art. Furthermore, the size of the collar segments may be varied and chosen so as to correspond to the diameter of the range pole 12, thereby permitting the range pole 12 to be slidably inserted into the central opening 58 formed by collar 26 and held therein by the arcuate portions 34 of each collar segment 28, 30, 32.

The ability to tighten and loosen the hinged connection of the tripod legs 14, 16, 18 to the collar 26 makes the present invention a substantial improvement over the prior art. When placing the tripod in position, it is merely necessary to pivot the legs to the desired angle so as to achieve a level position for the collar 26. Then further movement of the collar 26 with respect to the legs may be prohibited by tightening nuts 46 so as to lock the legs 14, 16, 18 against hinge movement with respect to the collar. This makes the tripod a rigid unit which will not move during the surveying operation. The range pole then is inserted into the opening 58 and held in place either by the thumb screws 50 or by other grasping means. Furthermore, each of the collar segments 28, 30, 32 can be easily replaced in the event of damage. They are simple in construction and inexpensive.

Thus, it can be seen that the device accomplishes at least all of its stated objectives.

What is claimed is:

1. A tripod for holding a surveyor's stake comprising:

collar means comprising at least three collar segments, each of said collar segments comprising an arcuate portion having opposite ends, each of said opposite ends having a hinge flange extending radially outwardly with respect to the arc of curvature of said arcuate portion, said flanges each having a bolt receiving hole therein;

at least three legs, each having an upper end and a lower end;

said collar segments being positioned in end to end relation to form a continuous circle with said hinge flanges or the adjacent ends of said segments being paired in facing spaced apart relation with said bolt receiving holes of said paired spaced apart flanges being in registered alignment;

said upper ends of said legs having a surface for mating engagement with said hinge flanges and each leg being interposed between one of said spaced apart pairs of flanges, said upper ends of said legs each having a bolt receiving hole in registered alignment with said bolt receiving holes of said one spaced apart pair of flanges;

a bolt extending through each of said registered pairs of bolt receiving holes in said pairs of flanges and also extending through said bolt receiving hole in said upper end of the one of said legs therebetween;

said bolt having a head at one end thereof and nut means threadably engaging the opposite end thereof to permit threadable adjustment of the tightness with which said head and nut press said pair of flanges and said upper end of said leg together whereby said legs can be selectively pivoted into a desired position and locked into that position;

said collar segments and said legs when fully assembled forming a stake receiving opening located centrally with respect to the circle formed by said segments, holding means connected to said collar means for grasping and holding a vertically disposed surveyor's stake extending through said stake receiving opening to a point adjacent the ground surface, at least three thumb screws each threadably extending through one of said collar segments in a radial direction with respect to said stake receiving opening; each of said thumb screws having an inner radial end adapted to move towards and retentively engage a surveyor's stake within said stake receiving opening in response to rotation of said thumb screw so as to hold said stake in a vertical position, each of said legs being pivotable independent of one another in a substantially unlimited arc about the axis of said bolt extending through said bolt receiving hole in said leg.

* * * * *